UNITED STATES PATENT OFFICE.

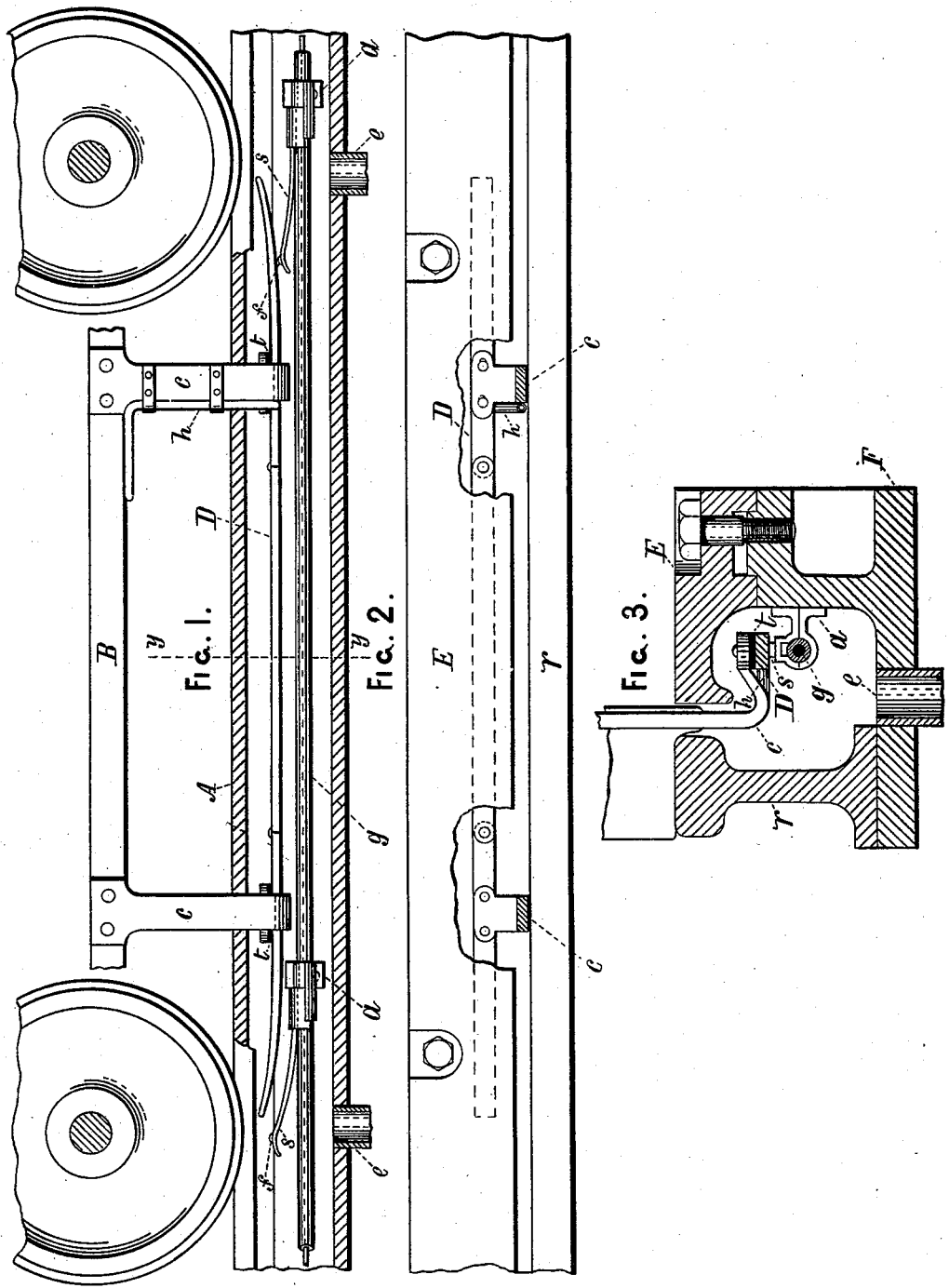

FREDERICK S. DAVENPORT, OF JERSEYVILLE, ILLINOIS.

CONDUIT SYSTEM FOR ELECTRIC RAILWAYS.

SPECIFICATION forming part of Letters Patent No. 533,869, dated February 12, 1895.

Application filed October 26, 1894. Serial No. 527,094. (No model.)

*To all whom it may concern:*

Be it known that I, FREDERICK S. DAVENPORT, a citizen of the United States, residing at Jerseyville, in the county of Jersey and State of Illinois, have invented a new and useful Improvement in Electric Railways, of which the following is a specification.

My invention relates to an improved underground conduit system for electric railways, of that class designed to supersede the overhead feed-wire system.

My object is to provide a system so simplified as to reduce the cost of construction, and also effect greater economy than heretofore in the use of the motive power and also admit the employment of a very small conduit near the surface of the road-bed, requiring only a small excavation for its reception, and affording the important advantage of not interfering with either gas mains, water mains, or sewers. In lieu of the trolley-rail, or stationary line of separately insulated and successively electrified bars, their junction-boxes and complicated actuating mechanism as recently brought into use, I employ a single bar carried within the conduit by the car, and adapted to travel therewith, in frictional contact with discharge facets which are in electrical connection with an insulated feed-wire located in the conduit, as more fully explained in the following specification, and illustrated in the accompanying drawings, in which—

Figure 1 is a side elevation of the device partly shown in section taken in the line of the slot in which the flanges of the wheels travel. Fig. 2 is a top view of the conduit showing the contact bar partly in dotted lines, and Fig. 3 is a transverse sectional view of the conduit and its contents on a larger scale taken in the line $y$, $y$, Fig. 1.

A, represents the conduit, placed on the inner side of the rail so that the latter shall form one side of it.

B, represents a part of one side of the car-truck from which depend two arms $c$, $c$, reaching down into the interior of the conduit through the slot which serves also for the flanges of the wheels to travel in. To the lower ends of the arms $c$, $c$, as shown in Fig. 1, is secured, but insulated therefrom by non-conducting plates $t$, (see Fig. 3,) a long metallic contact bar D, which may, for rounding sharp curves, be provided with joints as shown in dotted lines. Beneath this bar is an insulated feed-wire $g$, supported upon brackets $a$, secured to the wall of the conduit, as shown in Figs. 1 and 2, and provided at intervals with spring conductors S, having electrical connection with the feed-wire, and covered with insulating material excepting a small convex surface or facet $f$, near the extremity thereof which is left bare for contact with the bar D, which is also covered with insulating material except its under face which is left bare for contact with the metallic facets $f$, the electricity being conducted from said bar to the motor by an insulated wire $h$, as shown in Fig. 1.

Referring to Fig. 3, it will be seen that the conduit consists essentially of three parts, a base piece F, rail $r$, and removable cover E, so combined as to form a conduit the slot of which serves for the reception of the arms $c$, $c$, and also for the flanges of the car-wheels. The chief advantage of this construction is, in addition to economy, that in whichever direction the car may be traveling, the arms $c$, $c$, are preceded by one of the wheels the flange of which will remove any ordinary obstruction lodged in the slot. Drainage is provided for by pipes $e$, leading from the bottom of the conduit to catch-basins or other suitable receptacles. The combination of these three parts as shown in the drawings, produces an inexpensive conduit effectively sheltering the feed-wire, and also affording, by the simple removal of the cover E, ready and full access to the interior for inspection or repairs, without any interference with the road-bed or pavement.

It will be noticed that the under face of the bar D, is much wider than the spring conductors S, for the purpose of insuring contact with the facets $f$, when rounding sharp curves. It will also be seen that the arms $c$, $c$, reach downward below the level of the bar D, so that such water as may collect upon them will run off at their lowest points instead of being discharged upon the collecting bar. The conduit cover E, as will be observed, is, for a similar purpose, provided with a downward projecting flange or lip on its inner edge, which sheds from its lowest point, the water that might otherwise find its way to the facets $f$.

As to the operation of the device, it will be noticed that as the car travels, the under face of the bar D, is brought successively into contact with the facets of the springs S; an uninterrupted current of electricity to the motor being maintained by having the contact bar D of such length that it will not leave one facet until in full engagement with the next.

The discharge from the motor may be effected in the ordinary way, or through a wire similar to the feed-wire and contained in a similar conduit connected with the opposite rail, thus avoiding the possibility of short circuiting by proximity of positive and negative wires.

It is obvious that numerous changes in the construction and arrangement of the several parts of my device might be resorted to without departing from the spirit of my invention, and hence I would have it understood that I do not limit myself to the exact construction and form of parts shown and described, but consider myself at liberty to make such changes as come within the spirit and scope of my invention.

What I claim, and desire to secure by Letters Patent, is—

In an electric railway system, the combination with a feed-wire and traveling contact bar substantially as described, of an underground conduit having for one of its sides, one of the track rails secured to the laterally projecting base of the opposite side, the top of the latter being surmounted by a removable cover E, adapted to shelter and protect the feed-wire and contact bar; all of said parts constructed and adapted to operate substantially as and for the purpose set forth.

In testimony that I claim the foregoing I have hereunto set my hand this 20th day of October, 1894.

FREDERICK S. DAVENPORT.

Witnesses:
   J. M. PAGE,
   ROBERT NEWTON.